(12) United States Patent
Difante

(10) Patent No.: US 8,707,860 B2
(45) Date of Patent: Apr. 29, 2014

(54) OBLONG COOKING CONTAINER WITH STRAINER-BASKET

(76) Inventor: Agostino Difante, San Clemente, CA (US)

( * ) Notice: Subject to any disclaimer, the term of this patent is extended or adjusted under 35 U.S.C. 154(b) by 222 days.

(21) Appl. No.: 13/200,275

(22) Filed: Sep. 22, 2011

(65) Prior Publication Data

US 2013/0074702 A1 Mar. 28, 2013

(51) Int. Cl.
A47J 27/04 (2006.01)
A47J 37/06 (2006.01)
A47J 36/20 (2006.01)
A47J 36/08 (2006.01)

(52) U.S. Cl.
CPC *A47J 27/04* (2013.01); *A47J 36/20* (2013.01); *A47J 36/08* (2013.01)
USPC ............ 99/413; 99/417; 210/469; 210/473

(58) Field of Classification Search
CPC ............ A47J 27/04; A47J 36/20; A47J 36/08
USPC ............ 99/413, 410, 417, 415, 412; 210/469, 210/471, 473, 475, 465
See application file for complete search history.

(56) References Cited

U.S. PATENT DOCUMENTS

| | | | |
|---|---|---|---|
| 1,004,423 A * | 9/1911 | Hanlon et al. | 220/759 |
| 1,238,688 A * | 8/1917 | Kinkel | 99/412 |
| 2,061,533 A | 11/1936 | Anetsberger | |
| 2,064,214 A | 12/1936 | Merkle | |
| 2,132,099 A | 10/1938 | Doering et al. | |
| 2,188,563 A | 1/1940 | Anzalone | |
| 2,307,408 A | 1/1943 | Kent | |
| 2,555,720 A * | 6/1951 | Wiegel | 99/413 |
| 2,576,332 A | 11/1951 | Derck | |
| 2,588,614 A | 3/1952 | Capra | |
| 2,742,849 A | 4/1956 | Stiglitz | |
| 2,753,436 A | 7/1956 | Schwaneke | |
| 2,785,277 A | 3/1957 | Jepson | |
| 4,401,017 A | 8/1983 | Feld | |
| 4,574,776 A | 3/1986 | Hidle | |
| 4,604,989 A | 8/1986 | Kita | |
| 4,626,352 A | 12/1986 | Massey et al. | |
| 5,221,475 A | 6/1993 | Mealey et al. | |
| 5,287,798 A * | 2/1994 | Takeda | 99/413 |
| D349,420 S | 8/1994 | Hasuike | |
| 5,402,714 A | 4/1995 | Deneault et al. | |

(Continued)

OTHER PUBLICATIONS

Non-Final Office Action Dated Jan. 3, 2013 in U.S. Appl. No. 12/932,357.

(Continued)

*Primary Examiner* — Reginald L Alexander
(74) *Attorney, Agent, or Firm* — Robert D. Buyan; Stout, Uxa, Buyan & Mullins, LLP

(57) ABSTRACT

Apparatus for cooking foods such as pasta and or rice including a container which receives a liquid to be heated, and a cooking strainer-basket that is partially submerged within the liquid and container for cooking of food. The container and basket having an oblong shape wherein the median length dimension is greater than the median width dimension. This shape provides for positioning of the basket within the container for cooking of the food, and then repositioning the basket above the liquid for straining of the food.

7 Claims, 5 Drawing Sheets

(56) References Cited

U.S. PATENT DOCUMENTS

| | | |
|---|---|---|
| 5,662,026 A | 9/1997 | Prakasa |
| 5,730,045 A | 3/1998 | Delaquis et al. |
| 5,826,494 A | 10/1998 | Wang |
| 5,918,535 A | 7/1999 | Moreau |
| 6,055,901 A * | 5/2000 | Gantos et al. ............ 99/412 |
| 6,103,291 A | 8/2000 | Fernandez Tapia |
| 6,269,737 B1 | 8/2001 | Rigney et al. |
| 6,314,869 B1 | 11/2001 | Bourgeois, Jr. |
| 6,446,545 B2 | 9/2002 | Rigney |
| 6,546,849 B1 | 4/2003 | Shimazaki |
| 6,568,314 B1 | 5/2003 | Stepanova |
| 7,021,202 B2 | 4/2006 | Sizer |
| 7,467,718 B1 | 12/2008 | Donohue |
| 7,878,110 B1 | 2/2011 | Michnik et al. |
| D639,109 S | 6/2011 | Molayem |
| D640,896 S | 7/2011 | Molayem |
| D642,421 S | 8/2011 | Difante |
| D646,525 S | 10/2011 | Molayem |
| D653,073 S | 1/2012 | Difante |
| D653,074 S | 1/2012 | Difante |
| D658,424 S | 5/2012 | Difante |
| D658,425 S | 5/2012 | Difante |
| D687,256 S | 8/2013 | Difante |
| D687,257 S | 8/2013 | Difante |
| 2004/0216620 A1 * | 11/2004 | Quiggins et al. ............ 99/413 |
| 2004/0238438 A1 | 12/2004 | Chen |
| 2005/0205487 A1 | 9/2005 | Rogers |
| 2006/0254976 A1 | 11/2006 | Cooper |
| 2012/0174798 A1 | 7/2012 | Kulikowski |
| 2012/0216683 A1 | 8/2012 | Difante |
| 2012/0240790 A1 | 9/2012 | Difante |
| 2013/0125765 A1 | 5/2013 | Difante |

OTHER PUBLICATIONS

Non-Final Office Action Dated May 10, 2013 in U.S. Appl. No. 12/932,357.

Non-Final Office Action Dated Aug. 12, 2013 in U.S. Appl. No. 13/373,639.

Non-Final Office Action Dated Sep. 25, 2013 in U.S. Appl. No. 12/932,357.

* cited by examiner

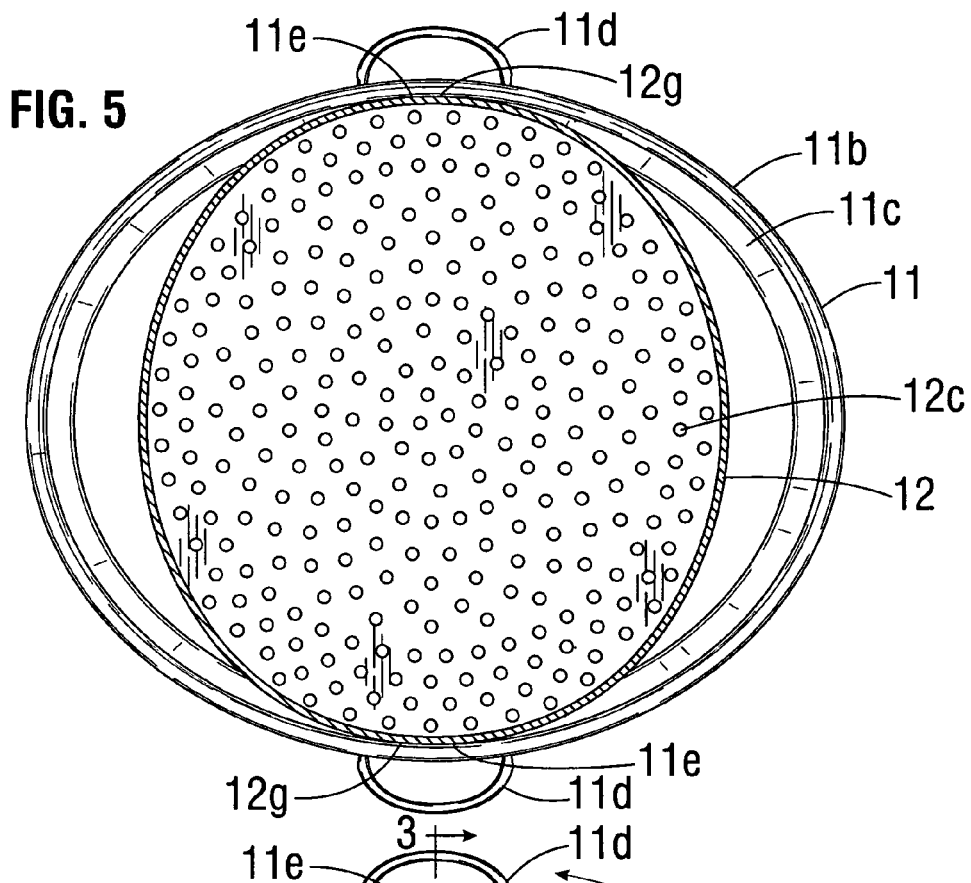
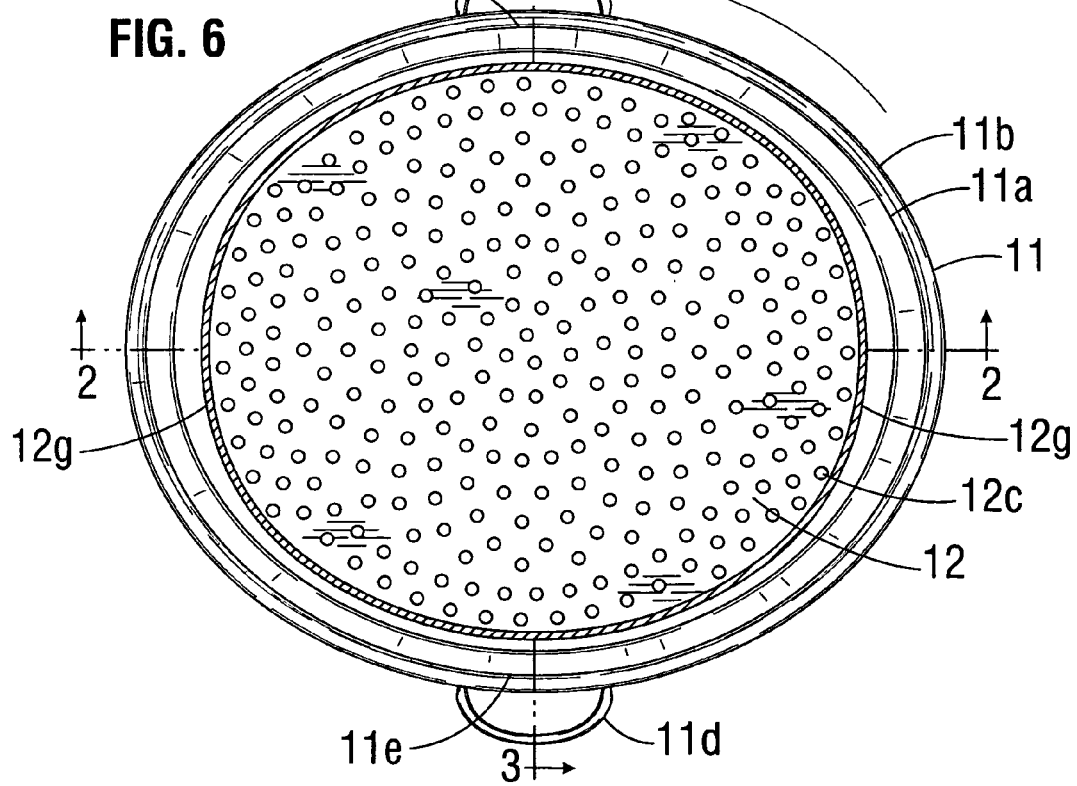

OBLONG COOKING CONTAINER WITH STRAINER-BASKET

BACKGROUND

The background of the invention will be discussed in two parts.

1. Field of Invention

The present invention relates in general to apparatus for cooking foods such as pasta and more particularly to a container having liquid to be heated and a cooking strainer-basket, the container and strainer-basket configured to have an oblong shape wherein the median length dimension is greater than the median width dimension for alternative positioning of the strainer-basket within the container for cooking of the food and repositioning the strainer-basket above the container for straining of the food.

2. Prior Art

Apparatus for cooking and/or straining of pasta and the like have become commonplace and a variety of such apparatus are known in the art, however, the prior art devices are either too complex or relatively inefficient. A device of interest is shown in U.S. Pat. Des. 353,303 issued to Davis on 13 Dec. 1994 which relates to a combined cooking utensil with lid and strainer. It is a feature of the present invention to provide new and improved cooking apparatus for cooking and straining of food that is more easy to use, more efficient, safer, and more economical than prior art devices. It is another feature of the invention to provide cooking and straining apparatus that does not require removal of the cooking basket from the container for straining of the food. Other objects of the invention will become apparent with reading of the specification taken with the drawings wherein there is shown and described the apparatus of the invention.

SUMMARY

The present invention provides apparatus for cooking foods such as pasta and includes a container which receives a liquid, such as water, to be heated and a cooking strainer-basket within the container which is partially submerged in the liquid for cooking, the container and basket configured to have an oblong shape wherein the median length dimension is greater than the median width dimension for alternatively positioning of the basket in the water, oil, or other liquid, for cooking of the food and repositioning of the basket above the water, oil, or liquid to provide for straining of the food.

DRAWINGS

FIG. 5 is a cross-sectional view of the strainer-basket positioned above the liquid for straining of food. As shown the median long dimension of the strainer-basket is rotated 90 degrees placing the bottom of the strainer-basket on the secondary rim of the median short dimension of the cooking container.

FIG. 6 is a cross-sectional view of the strainer-basket positioned within the cooking container for cooking of food. As shown the median long dimension of the strainer-basket is parallel and aligned with the median long dimension of the cooking container. In this position the strainer-basket can be inserted into the cooking container.

Figure 7:
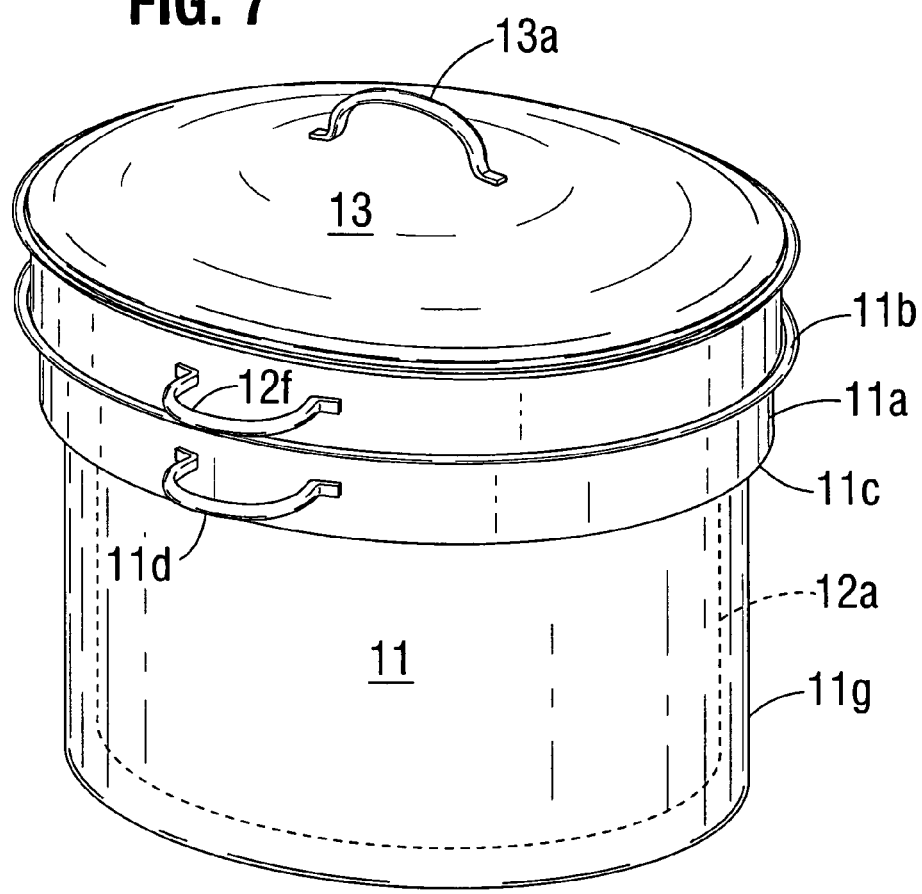

FIG. 7 is a perspective view of the assembled cooking apparatus

DESCRIPTION

Figure 1:
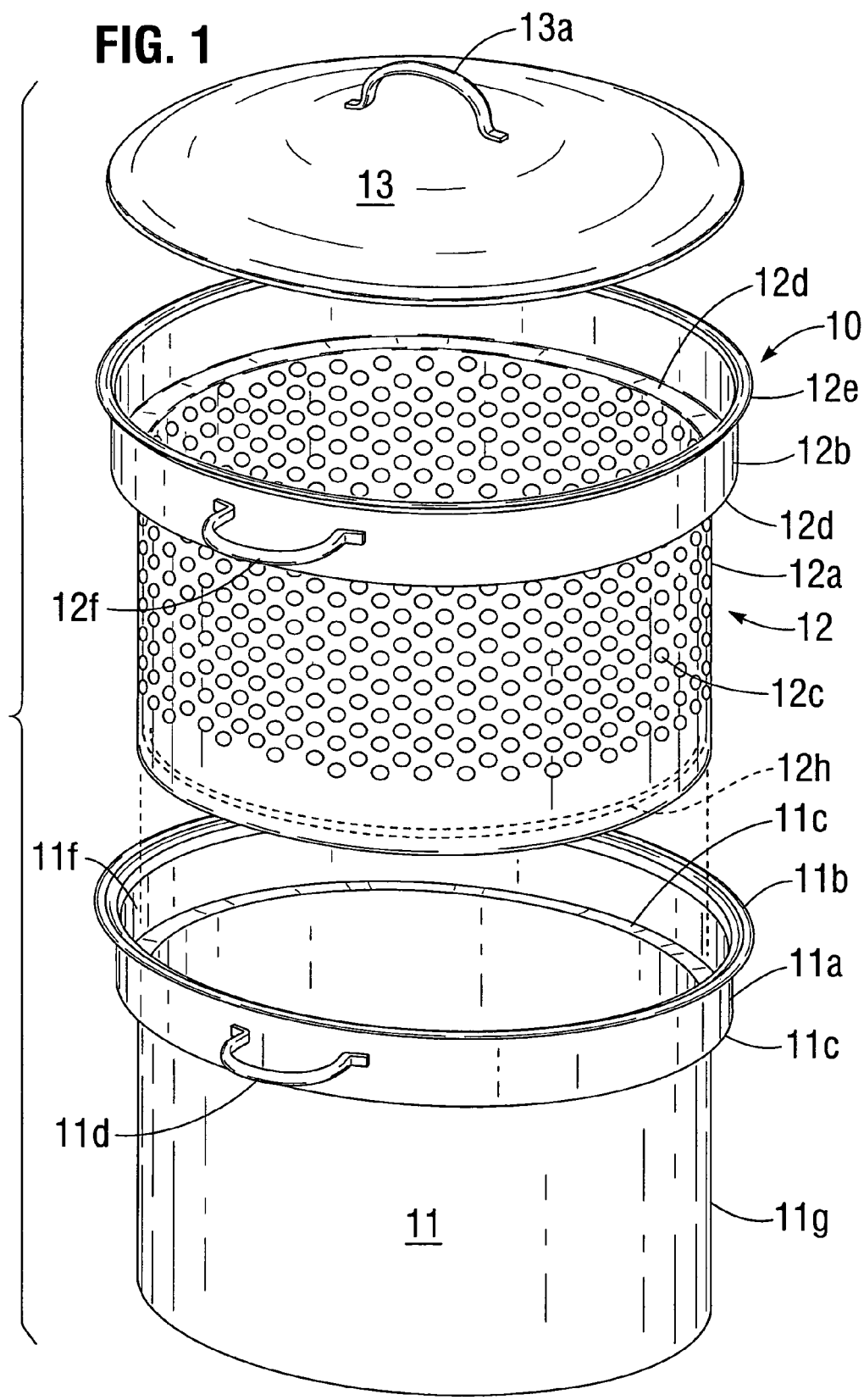
FIG. 1 is an exploded view of the cooking apparatus in accordance with the present invention.

Referring now to the drawings in general, and particularly to FIG. 1, there is shown in exploded view, the cooking apparatus of the invention, generally designated 10. The cooking apparatus 10 includes an oblong cooking container 11 wherein the median length dimension is greater than the median width dimension, having a lower section 11g and an upper section. 11a. The lower section 11g is oblong and typical of all cooking containers , the upper section 11a having a primary top rim 11b, and a secondary upper ledge 11c, the secondary ledge 11c provides a location for the bottom of strainer-basket 12 to be supported when it is raised out of the cooking liquid and rotated 90 degrees, within area 11f. An oblong cooking strainer-basket, generally designated 12, wherein the median length dimension is greater than the median width dimension, having a lower portion 12a with a size suitable for insertion into cooking container 11, and an upper circumferentially configured portion 12b with a size greater than the outside dimension of the upper section 11a of the cooking container 11 and configured with a shoulder-like projection 12d extending outwardly from the upper portion 12b of strainer 12 to restrain insertion of strainer-basket 12 into container 11, and a lid 13 for fitting over the upper portion 12b of strainer basket 12, and for alternatively fitting over the primary top rim 11b of cooking container 11. Container 11 contains two side handles 11d (one shown).

Lower portion 12a of strainer-basket 12 includes selectively placed multiple strainer aperatures 12c. The bottom of strainer-basket 12 is configured with selectively placed aperatures 12c and with an optional recessed bottom 12h shown dotted. The upper section of cooking container 11 having a primary rim 11b, and a secondary ledge 11c. The distance between the primary rim 11b and secondary ledge 11c shown 11f is sufficiently large enough to provide for lifting of the strainer-basket 12 out of the cooking liquid, rotating the strainer-basket 90 degrees within the distance 11f so that none of the liquid spills out of the cooking container 11, while setting the bottom of strainer-basket 12 on secondary ledge 11c for draining of food.

Figure 2:
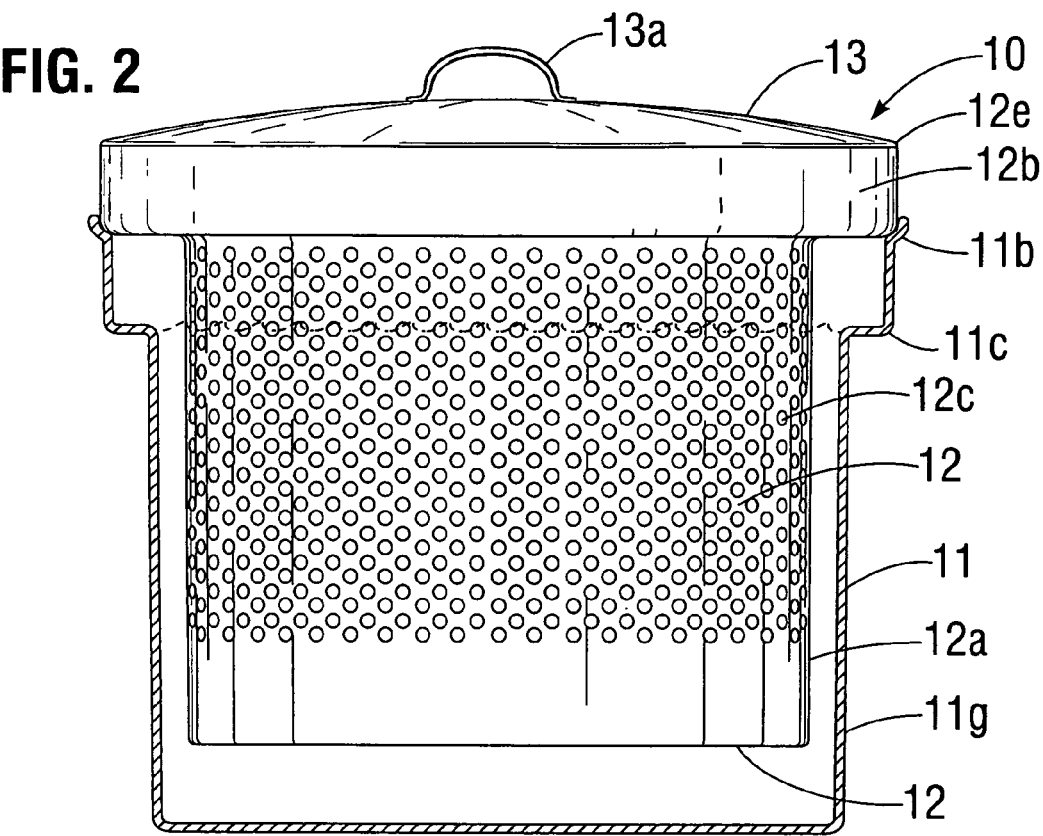
FIG. 2 illustrates in cross-sectional view taken through the median long dimension of the cooking container of FIG. 1 submerged in the water for cooking of food.

FIG. 2 illustrates in cross-sectional view the cooking strainer-basket 12 of FIG. 1 submerged in water (indicated by wavy lines) for cooking of food. In this figure, the cross-sectional view is taken through the median long dimension of the cooking container 11 and the median long dimension of the strainer-basket 12. The median long dimension of the strainer-basket 12 is parallel and aligned with the median long dimension of the cooking container 11, thus allowing the strainer-basket 12 to be inserted into the cooking container 11, for cooking of food. In this figure the primary rim 11b of container 11, and the secondary ledge 11c of container 11 is more clearly shown. Also more clearly shown is how lip 12d of strainer-basket 12 rests on rim 11b to restrict insertion and support strainer-basket 12.

Figure 3:
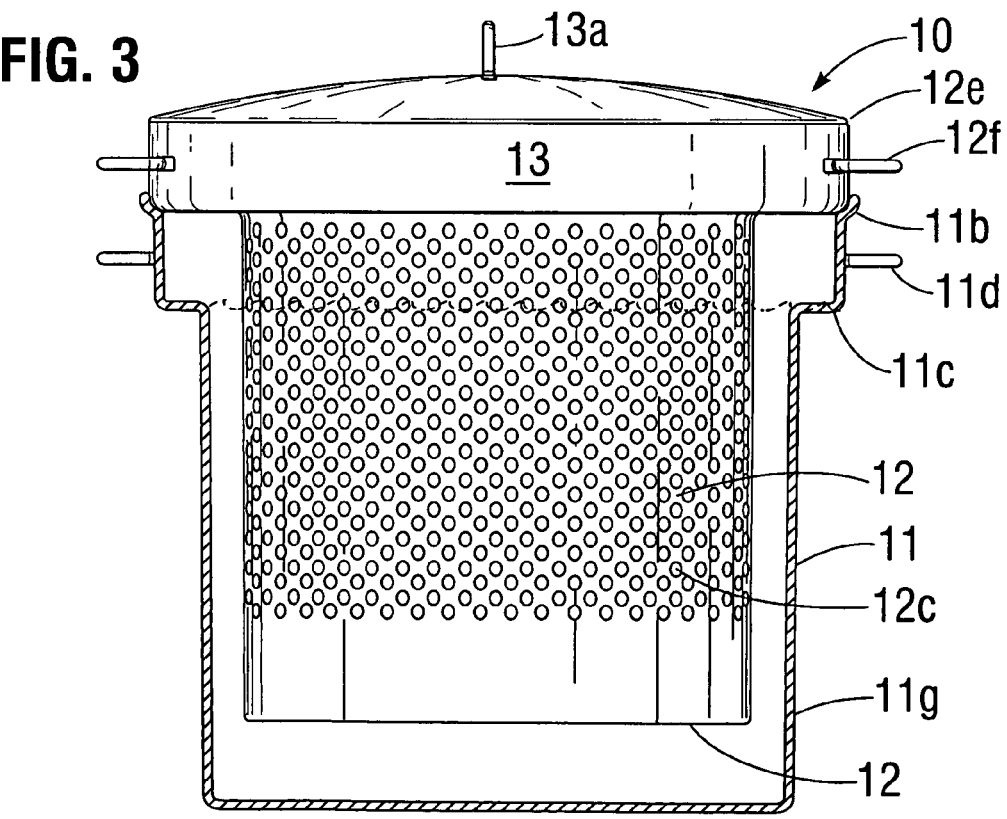
FIG. 3 illustrates in cross-sectional view taken through the median short dimension of the cooking container of FIG. 1 submerged in water for cooking of food.

FIG. 3 illustrates in cross-sectional view the cooking strainer-basket 12 of FIG. 1 submerged in water (indicated by wavy lines) for cooking of food. In this figure, the cross-sectional view is taken through the median short dimension of the cooking container 11, and the median short dimension of the strainer-basket 12. The median short dimension of the strainer-basket 12 is parallel and aligned with the median short dimension of the cooking container 11, thus allowing the strainer-basket 12 to be inserted into the cooking container 11, for cooking of food. In this figure the primary rim 11b of container 11, and the secondary ledge 11c of container 11 is more clearly shown. Also more clearly shown is how lip 12d of strainer-basket 12 rests on rim 11b to restrict insertion and support strainer-basket 12.

Figure 4:
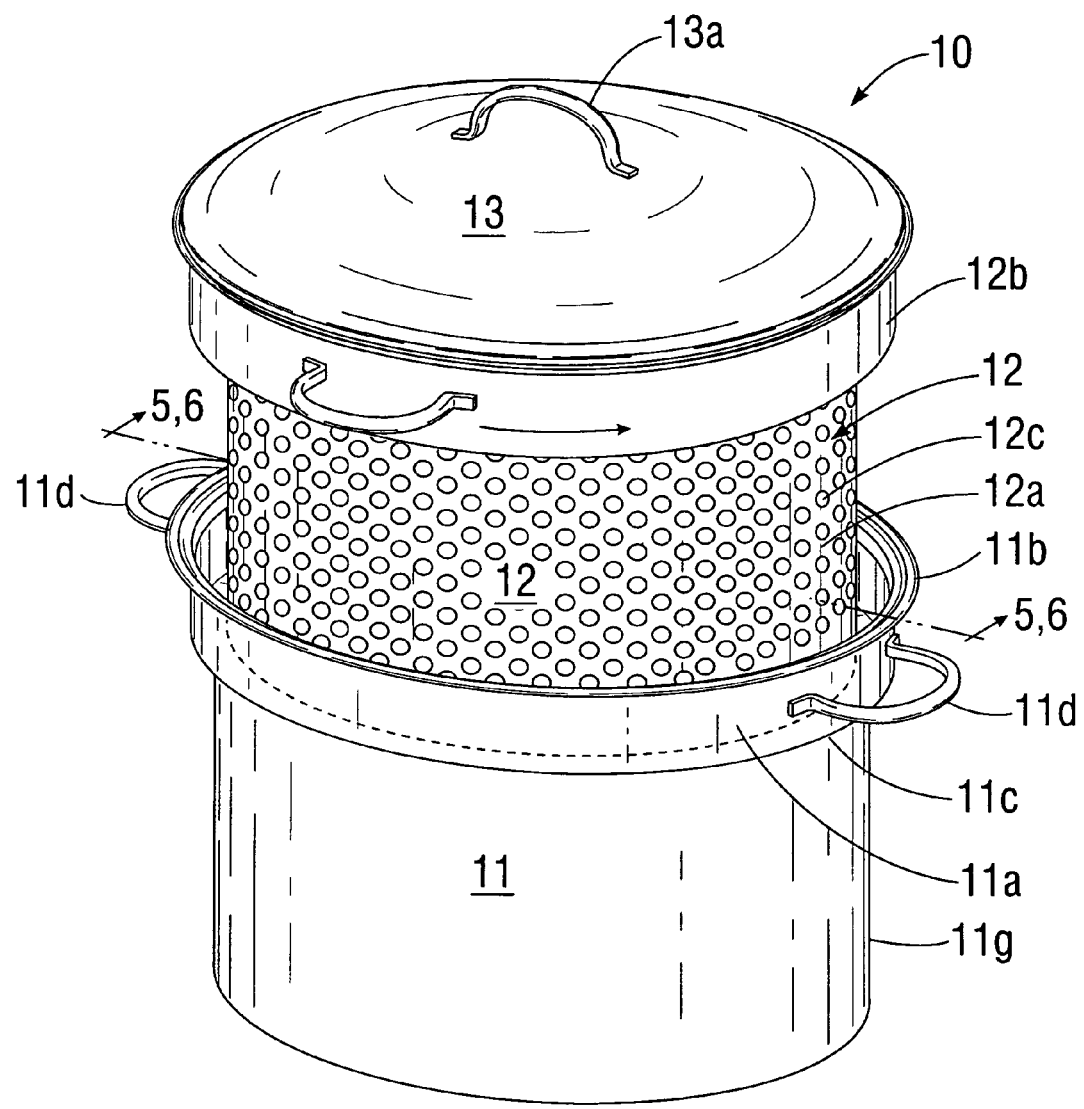
FIG. 4 illustrates the strainer-basket of FIG. 1 positioned above the cooking liquid for straining of food and with the strainer-basket rotated 90 degrees placing the median long dimension of the strainer-basket on the secondary rim of the median short dimension of the cooking container.

FIG. 4 shows strainer-basket 12 positioned in the food straining position above the liquid in container 11. As indicated by the arrow, strainer-basket 12 has been rotated 90 degrees within cooking container 11, so that the bottom of the median long dimension of strainer-basket 12, rests on the ledge 11c of the median short dimension of the cooking container 11. In this position, due to the oblong shape the bottom of the median long dimension of strainer-basket 12 is restricted from entering the median short dimension of the cooking container 11, and strainer-basket 12 is supported above the cooking liquid for straining of food.

FIG. 5 is a top cross-sectional view through the lower portion 12a of strainer-basket 12 showing how the median long dimension of the bottom of strainer-basket 12 is placed on the median short dimension of the secondary ledge 11c of cooking container 11. In this position strainer-basket 12 is rotated 90 degrees and restricted from entering cooking container 11, and thus being supported above the cooking liquid for straining of food. Also shown in this figure are optional slightly flattened areas 11e of cooking container 11, and the slightly flattened areas 12g of strainer-basket 12. The preferred option is to flatten only the lower portion 12g of strainer-basket 12. These areas are slightly flattened to provide more bearing area when strainer-basket 12 is rotated 90 degrees and placed on secondary ledge 11c of cooking container 11.

FIG. 6 is a top cross-sectional view through the lower portion 12a of strainer-basket 12 and cooking container 11. In this view the strainer-basket 12 is fully inserted into cooking container 11 for cooking of food. In this figure it is more clearly shown how when the median long dimension of lower portion 12a of strainer-basket 12 is parallel and aligned with the median long dimension of cooking container 11 the lower portion 12a of strainer-basket 12 is capable of being inserted into container 11 for cooking of food. Also shown in this figure are optional slightly flattened areas 11e of cooking container 11, and slightly flattened areas 12g of strainer-basket 12. The preferred option is to flatten only the lower portion 12g of strainer-basket 12. These areas are slightly flattened to provide more bearing area when strainer-basket 12 is lifted out of the cooking liquid, rotated 90 degrees and placed on secondary ledge 11c of cooking container 11, as shown in FIG. 5.

FIG. 7 is a perspective view showing the assembled cooking apparatus as it would be stored. Also shown dotted is lower portion 12a of strainer-basket 12 fully inserted into cooking container 11, and lid 13 placed on strainer-basket rim 12e.

While the principles of the invention have been described and illustrated in a singe embodiment, it will be obvious to those skilled in the art that many modifications of structure, arrangement, proportions, materials, and components used in the practice of the invention can be particularly adapted for specific environments and operating requirements without departing from these principles.

What is claimed is:

1. A food cooking apparatus comprising:
a container for receiving a cooking liquid to be heated;
a food strainer-basket positionable within said container for partially submerging within said cooking liquid, said container and said strainer-basket having an oblong shape wherein the median length dimension is greater than the median width dimension, for positioning of the basket in the liquid for cooking of the food and for repositioning of the cooking basket above the liquid for straining of the food;
wherein said cooking container contains a lower portion and an upper portion configured in an oblong shape having a median length dimension that is greater than the median width dimension, said upper portion comprising a primary circumferentially outwardly extending upper lip and a secondary circumferentially outwardly extending lower lip;
wherein aid strainer-basket includes a lower portion and an upper portion, said lower portion submersible in said cooking liquid and having selectively placed strainer aperatures, and configured in an oblong shape having a median length dimension that is greater than the median width dimension;
wherein said container and said strainer basket are generally oval, said container having an oblong shape wherein the median length dimension is greater than the median width dimension and said strainer-basket having an oblong shape wherein the median length dimension is greater than the median width dimension;
wherein said strainer-basket is insertable into said cooking container when the median long dimension of the cooking container and the median long dimension of the said strainer-basket are aligned;
wherein said strainer-basket is not insertable into said cooking container when it is rotated 90 degrees so that the long median dimension of said strainer-basket is perpendicular and misaligned with the median short dimension of said cooking container, therein providing support for said strainer-basket above said cooking container for straining of the food; and
wherein said cooking container includes a circumferentially outwardly extending lower secondary lip below the top lip, and when said strainer-basket is raised and rotated above said cooking container for draining of the food, said lower portion of said strainer-basket is supported within said secondary outwardly extending upper lip of said cooking container.

2. The food cooking apparatus of claim 1 with said oblong shape having a median length dimension that is greater than the median width dimension wherein said strainer basket may be lowered into said cooking container when long dimension of strainer basket and long dimension of cooking container are aligned.

3. The cooking apparatus of claim 1 with said oblong shape having a median length dimension that is greater than the median width dimension restrains insertion of said strainer-basket when it is rotated 90 degrees misaligning and placing the long dimension of said strainer-basket along the short dimension of said cooking container, thus supporting said strainer-basket above the liquid for straining of food.

4. The food apparatus of claim 1 wherein:
said cooking container includes a circumferentially outwardly extending primary top lip;

said strainer-basket upper portion is circumferentially configured and extends outwardly from said strainer basket; and when said strainer-basket is fully inserted into said cooking container, said upper portion is supported within said primary lip of said cooking container.

5. The food cooking apparatus of claim 1 wherein:

said container and said strainer-basket are of an oblong shape wherein the median length dimension is greater than the median width dimension and said strainer-basket having a size suitable for fitting into said cooking container;

said cooking container includes a primary outwardly extending top lip, and a secondary outwardly extending generally flat lower lip;

said strainer-basket having a lower portion and an upper portion, said lower portion includes selectively placed strainer apertures and when said strainer-basket is fully inserted into said cooking container, said upper portion is supported within said primary upper lip of said cooking container when said strainer-basket is place above the liquid for straining of the food, said lower portion of said strainer-basket is supported within said secondary upper lip of said cooking container.

6. The food cooking apparatus of claim 5 further including a top lid for fitting over said upper portion of said strainer-basket and within outwardly extending primary lip of said cooking container.

7. A food cooking apparatus comprising:

an oblong cooking container for receiving a cooking liquid to be heated said cooking container having a side wall an a ledge protruding from the side wall; and an oblong strainer-basket which is a) initially positionable in a first rotation orientation and insertable past the ledge to a submersed position within the cooking container and b) subsequently movable to a draining position by lifting the strainer-basket above the ledge, rotating the strainer basket to a second rotational orientation and then lowering the strainer-basket to said draining position wherein the bottom of the strainer basket rests on the ledge and is entirely inboard of the cooking container side wall such that all liquid which drains from the strainer basket is received within the cooking container;

wherein strainer-basket has an elliptical side wall with strainer apertures formed in said side wall.

* * * * *